United States Patent
Larson et al.

(10) Patent No.: US 7,324,512 B2
(45) Date of Patent: Jan. 29, 2008

(54) MAC LAYER BRIDGING OF NETWORK FRAMES BETWEEN ISOLATED AND EXTERNAL NETWORKS

(75) Inventors: David Anthony Larson, Rochester, MN (US); Kyle Alan Lucke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 10/459,761

(22) Filed: Jun. 12, 2003

(65) Prior Publication Data

US 2004/0255047 A1 Dec. 16, 2004

(51) Int. Cl.
*H04L 12/26* (2006.01)
*H04L 12/56* (2006.01)

(52) U.S. Cl. .................................. 370/389

(58) Field of Classification Search .............. 370/389, 370/401, 412, 400, 445, 466, 392, 395.5, 370/345, 395; 709/220, 200, 249, 242, 226, 709/235, 224, 221, 222; 710/1; 700/18
See application file for complete search history.

(56) References Cited

U.S. PATENT DOCUMENTS

| | | | | |
|---|---|---|---|---|
| 6,052,733 A | * | 4/2000 | Mahalingam et al. | 709/235 |
| 6,438,128 B1 | * | 8/2002 | Kashyap | 370/389 |
| 7,225,253 B2 | * | 5/2007 | Ofir et al. | 709/224 |
| 2004/0068331 A1 | * | 4/2004 | Cronquist | 700/18 |
| 2004/0208158 A1 | * | 10/2004 | Fellman et al. | 370/345 |
| 2004/0255047 A1 | * | 12/2004 | Larson et al. | 709/249 |
| 2006/0195617 A1 | * | 8/2006 | Arndt et al. | 710/1 |

* cited by examiner

*Primary Examiner*—Wing Chan
*Assistant Examiner*—Prenell Jones
(74) *Attorney, Agent, or Firm*—Wood, Herron & Evans, LLP

(57) ABSTRACT

An apparatus, program product and method bridge an isolated network such as a virtual network to an external network such as another virtual network or physical network by utilizing a network adapter on the other network that is assigned the same Media Access Control (MAC) address as an isolated network adapter on the isolated network.

11 Claims, 4 Drawing Sheets

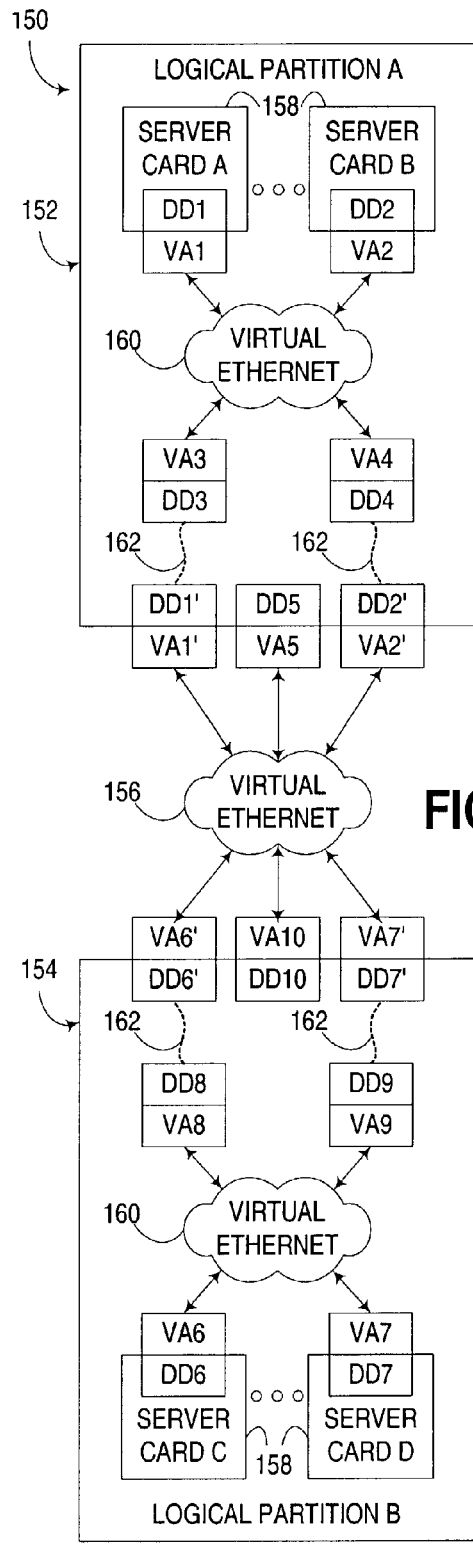
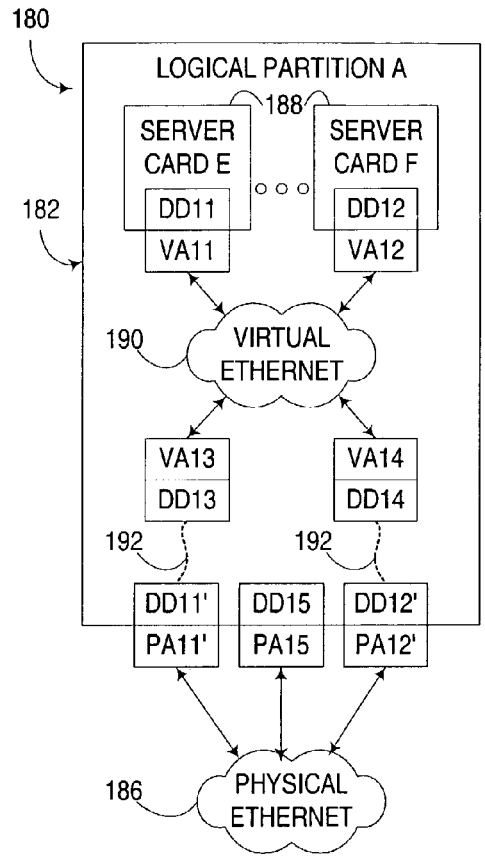
FIG. 6
FIG. 7

MAC LAYER BRIDGING OF NETWORK FRAMES BETWEEN ISOLATED AND EXTERNAL NETWORKS

FIELD OF THE INVENTION

The invention relates to computers and computer software, and in particular, to bridging network traffic between isolated and external networks.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads so that multiple tasks can essentially be performed at the same time.

In addition, some computers implement the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

Some logically-partitioned computers, as well as some non-logically-partitioned computers, may additionally support the use of integrated computers. For example, some computers may support the use of integrated card-based computers, where complete computers, including all necessary processors, memory and support circuitry, are mounted on cards that are in turn mounted in slots in a logically-partitioned computer. Each card-based computer runs its own operating system, and in most respects operates as a separate computer. However, typically some resources used by a card-based computer, such as mass storage and network connections, are shared with and managed by the logically-partitioned computer.

In a logically-partitioned computer, integrated card-based computers are treated as system resources, and are typically allocated to different logical partitions, such that overall management and interaction with the card-based computers are handled by the logical partitions to which such card-based computers are allocated. The logical partitions also serve to manage mass storage and network connectivity for card-based computers in such a manner that the card-based computers are able to behave as if those computers were independent and stand-alone computers. In this manner, a large number of independently-acting card-based computers may be supported and managed by a single logically-partitioned computer.

Considering that card-based computers are permitted to behave like independent computers, and that logical partitions are also permitted to behave like independent computers, enabling these various computers to communicate with one another without the need for specialized functionality is highly desirable. Put another way, it is desirable to enable a card-based computer to communicate with a logical partition or another card-based computer, in the same manner as that card-based computer would communicate with any other independent computer. It is also desirable to permit a logical partition to communicate with other logical partitions or card-based computers in the same manner as that logical partition would communicate with any other independent computer.

To serve these needs, the concept of "virtual networking" has been developed. In a virtual network, a physical network is simulated in lower levels of software to enable higher levels of software to communicate in the same manner as would be required to communicate over a physical network.

For example, in an Ethernet-compatible network, connectivity is supported through the use of network adapters that are connected to a physical medium such as a series of wires, routers, hubs, switches, etc. The network adapters are typically implemented as cards that install in available slots in a computer. Each network adapter typically has an identifier that uniquely identifies the network adapter on the network, so that data can be sent to particular network adapters using their unique identifiers. For example, each network adapter may have a unique Media Access Control (MAC) address that uniquely identifies that adapter. Network information is then typically sent over a network in the form of frames, with those frames including the MAC addresses of both the source and destination network adapters. Logic in the network adapters, as well as in any hardware components in the network itself (e.g., routers, switches, etc.), enables network frames to ultimately reach the destination network adapter regardless of the actual topology of the network. As such, the computers that utilize such network adapters are able to send information over a network without regard for where other network adapters, and their respective computers, reside on the network.

Another aspect of Ethernet-based networking is the use of multiple layers of protocols to enable higher-level networking functionality. For example, many networks support the use of higher-level protocols such as TCP/IP to add functionality such as guaranteed delivery, dynamic addressing, delivery confirmation, etc. A TCP/IP packet, in essence, provides a header that "wraps" around a lower-level frame, e.g., a layer 2 frame that relies on MAC addressing. Higher level protocols such as TCP/IP, however, require additional software support in the computers coupled to a network to provide the additional functionality supported by the protocol.

From the perspective of a computer that utilizes a network adapter to connect to a physical network, program code resident in the computer, typically referred to as a "device driver", is used to effectively manage the interaction between the computer and its network adapter, including the transfer of data to and from the network. A device driver is typically designed for a specific make and model of network adapter, and enables the operating system of a computer to be designed to generically communicate with a network irrespective of the type of network adapter that is installed.

Virtual networking relies on many of the same protocols as physical networking, such that the operating system and device drivers in a computer that communicate with a virtual network are able to do so in the same manner that would occur were a physical network used. Instead of using physical network adapters, however, virtual networking relies on the use of "virtual" network adapters that effectively mimic the operations of a physical network adapter. The virtual network adapters are implemented in software, and logically reside outside of the scope of a computer attempting to communicate over a virtual network. As such, the fact that a network is virtual is effectively hidden from the computer.

Thus, for a card-based computer being managed by a logical partition, the virtual network adapter for the card-based computer is typically software that logically resides in a logical partition. Likewise, for a logical partition, the virtual network adapter therefor is typically implemented as software resident in a partition manager.

The software-based virtual network adapters in a virtual network are logically connected to one another to mimic the transfer of network frames over a network. This additional functionality is also typically implemented in software residing in the same logical entity as the virtual network adapters.

As with physical networking, it may be desirable in some circumstances to enable a virtual network adapter on a virtual network to communicate with network adapters on other networks. For example, in the aforementioned logically-partitioned computer architecture that utilizes integrated card-based computers, it may be desirable to permit an integrated card-based computer being managed by one logical partition to communicate with an integrated card-based computer being managed by another logical partition, or to communicate with another computer that is physically remote from the logically-partitioned computer (as a card-based computer may not have its own hardware-based network port). Given, however, that the virtual networks for the integrated card-based computers reside within the logical partitions, direct connectivity by computers that are not logically located in the same logical partition is prohibited. In this regard, the virtual networks implemented within a logical partition or within a partition manager are effectively "isolated" networks insofar as no direct communication is supported with external networks.

Thus, a significant need exists for a manner of "bridging" an isolated network such as a virtual network with another network (virtual or physical) that is external to the computer within which the virtual network is implemented.

Traditional bridging mechanisms used for bridging physical networks have not been found to be optimal for isolated or virtual network applications. For example, some physical networks rely on hardware network switches or routers to bridge network traffic between multiple networks. However, given that virtual networks are implemented entirely in software, the use of hardware switches and the like is not feasible. As another example, some physical networks rely on software-implemented network bridges to bridge traffic between network adapters coupled to different networks. Conventional software-implemented network bridges, however, typically rely on TCP/IP or other higher level protocols to implement bridging, which is relatively complex to implement, requires additional processing overhead, requires operating system participation, and limits bridging to data communicated only using specific higher level protocols.

Therefore, a significant need continues to exist in the art for a manner of bridging network traffic between an isolated network such as a virtual network, and other virtual and/or physical networks.

SUMMARY OF THE INVENTION

The invention addresses these and other problems associated with the prior art in providing an apparatus, program product and method in which an isolated network such as a virtual network is bridged to another virtual network or physical network by utilizing a network adapter on the other network that is assigned the same Media Access Control (MAC) address as a network adapter on the isolated network (hereinafter referred to as an isolated network adapter). By duplicating the MAC address on the two network adapters, bridging is effectively implemented at a lower network layer (e.g., layer 2) than that used in higher level bridging algorithms such as TCP/IP-based bridging.

Consistent with the invention, outbound network traffic transmitted by an isolated network adapter on an isolated network is bridged to another network by detecting the transmission of a network frame on the isolated network that has a source MAC address associated therewith that matches that of the isolated network adapter on the isolated network. Upon such detection, the network frame is then forwarded to the other network using another network adapter on the other network and having the same MAC address such that the source MAC address for the network frame effectively identifies the isolated network adapter as the source of the network frame. As such, from the perspective of a destination network adapter the isolated network adapter is considered the originator of the network frame.

Also consistent with the invention, inbound network traffic transmitted over another network to an isolated network adapter resident on an isolated network is bridged to the isolated network by simply forwarding network frames having a destination MAC address matching that of the isolated network adapter once received by another network adapter on the other network that has the same MAC address as the isolated network adapter.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a block diagram of the principal components involved in communicating data between two integrated computers in separate logical partitions of the logically-partitioned computer of FIG. 5.

FIG. 7 is a block diagram of the principal components involved in communicating data between an integrated computer and a physical network in the logically-partitioned computer of FIG. 5.

DETAILED DESCRIPTION

The embodiments discussed hereinafter bridge an isolated network such as a virtual network to an external network, such as another virtual network or physical network, by utilizing a network adapter on the other network that is assigned the same Media Access Control (MAC) address as an isolated network adapter on the isolated network.

To implement MAC layer bridging as described hereinafter, a computer coupled to an isolated network, and having a network adapter with a known MAC address, is coupled to an external network via an intermediate computer. The intermediate computer has the ability to see all traffic on the isolated network being sent by the isolated computer using an adapter having the known MAC address, as well as the ability to send frames to the isolated network with the appearance of coming from any source MAC address. In addition, the intermediate computer has a network adapter coupled to the external network and configured to use the same MAC address as the known MAC address of the isolated network adapter. Since these adapters are on separate networks, no duplicate MAC addresses will be seen.

When the intermediate computer sees that a frame has been sent from the known source MAC address on the isolated network, the intermediate computer is configured to send an identical frame to the external network using its network adapter that is configured to use the same source MAC address. Likewise, when the intermediate computer receives a frame from the external network that is addressed to the known MAC address, the intermediate computer will send an identical frame to the isolated network to be received by the isolated network adapter.

As will become more apparent below, one manner in which an intermediate computer can relay frames between an isolated network and an external network is through the use of cooperative network adapters and device drivers that are respectively coupled to the isolated and external networks. Specifically, the device drivers for the network adapters coupled to each of the isolated and external networks may be configured to pass MAC layer traffic to one another to ensure that outbound and inbound data frames emanating from, and directed to, the isolated network adapter are passed to and from the external network. However, it will be apparent to one of ordinary skill in the art having the benefit of the instant disclosure that in lieu of an intermediate network adapter and cooperative device drivers, other manners of communicating data between a network adapter on an isolated network and a network adapter on an external network may be used to implement MAC layer bridging consistent with the invention.

Figure 1:
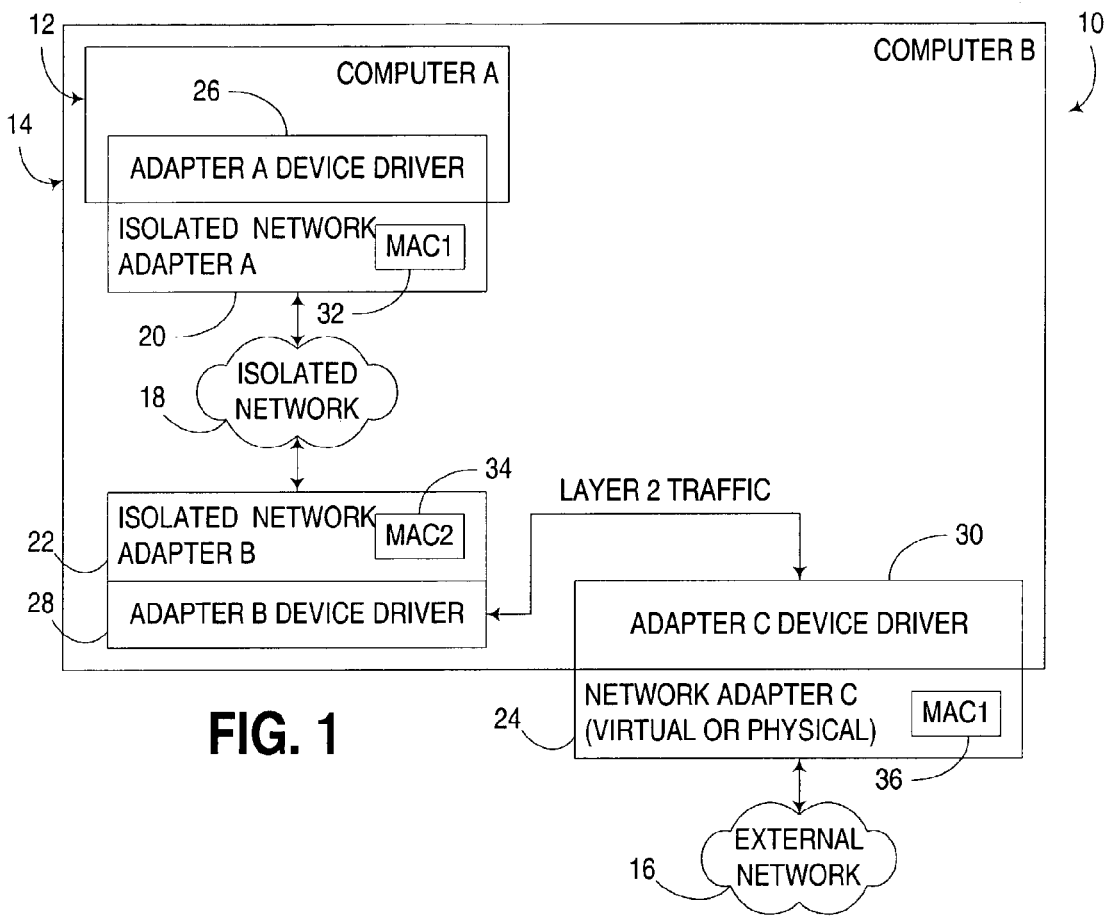
FIG. 1 is a block diagram of an exemplary computer architecture supporting MAC layer network bridging for a virtual isolated network in a manner consistent with the invention.

Turning now to the Drawings, wherein like numbers denote like parts throughout the several views, FIG. 1 illustrates an exemplary computer architecture 10 wherein a first computer 12 (also designated "computer A") is shown resident within a second computer 14 (also designated "computer B"). Computer 14 is coupled to an external network 16, whereas computer 12 is logically coupled to computer 14 via an isolated network 18.

Network 18 is isolated from the standpoint that the network is not directly coupled to external network 16. As will become more apparent below, either of networks 16, 18 may be implemented as a physical network or as a virtual network. In the implementation of FIG. 1, for example, isolated network 18 is implemented as a virtual network resident in computer 14. In this implementation, in particular, computer 12 is logically managed by computer 14, typically where computer 12 is either an integrated computer installed into computer 14, or where computer 12 is a logical partition or other form of "virtual computer" that is executing on the hardware of computer 14.

To implement MAC layer bridging consistent with the invention, architecture 10 relies on a set of network adapters 20, 22 and 24, each managed by an associated device driver 26, 28 and 30, and each having a stored MAC address 32, 34 and 36. In particular, computer 12 communicates with network 18 through the use of a device driver 26 that is logically coupled to an isolated network adapter 20 (also designated as "adapter A") that is in turn logically coupled to network 18. As represented by the inclusion of device driver 26 within the box designating computer 12 in FIG. 1, device driver 26 is within the "scope" of computer 12. Likewise, the exclusion of network adapter 20 from the box designating computer 12 represents the fact that the adapter is outside of the scope of computer 12, and thus the fact that the adapter may be a virtual adapter is effectively hidden from computer 12.

Also coupled to network 18 is another network adapter 22 (also designated as "adapter B"), which is managed by a device driver 28 that is resident in computer 14. Computer 14 then communicates with network 16 via a network adapter 24 (also designated as "adapter C") that is managed by a device driver 30. Device drivers 28 and 30 are both resident in computer 14, and as such, may communicate with one another in the scope of computer 14.

MAC layer bridging consistent with the invention is implemented in architecture 10 specifically through the interaction of device drivers 28, 30 in passing frames of data between networks 16 and 18, which in the illustrated embodiments occurs in the form of layer 2 (MAC layer) traffic. It will be appreciated that data transmitted over a network is typically partitioned into data elements often referred to as "packets" or "frames," depending on the particular protocol used. As such, the term "frame" will hereinafter be used to refer to any type of data element communicated over a network, including a packet.

In addition, network adapters 20, 24 are assigned the same source MAC address (designated here as "MAC1") such that outbound frames generated by network adapter 20 (and thus having source MAC addresses of MAC1) will be relayed to adapter 24 and output to network 16 using the same source MAC address of MAC1. Likewise, inbound data frames having a destination MAC address of MAC1 will be recognized by adapter 24 and automatically forwarded to network 18 via the interaction of device drivers 28, 30.

Figure 2:
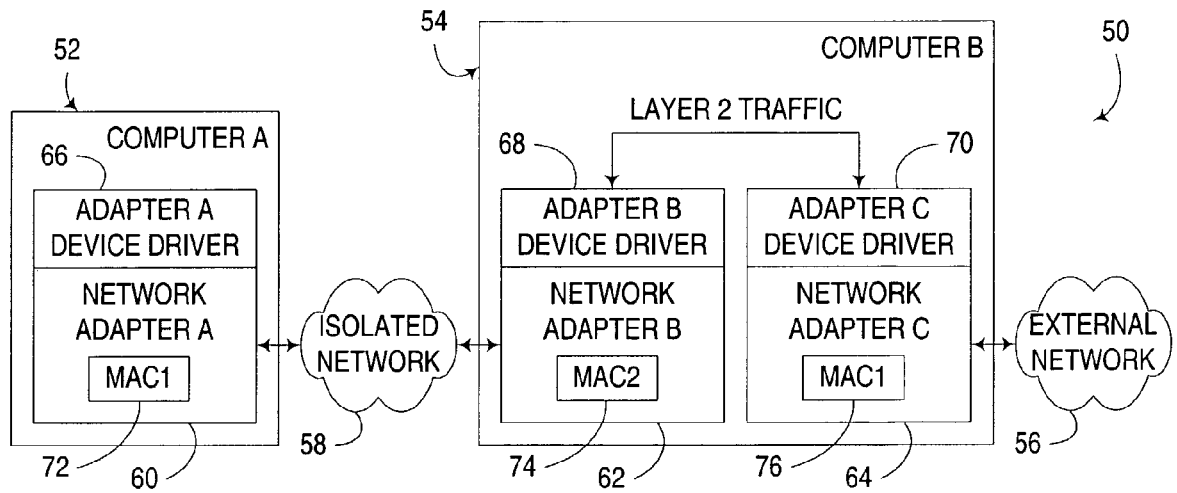
FIG. 2 is a block diagram of another exemplary computer architecture supporting MAC layer network bridging for a physical isolated network in a manner consistent with the invention.

An alternate implementation of a computer architecture suitable for utilizing MAC layer bridging consistent with the invention is illustrated at 50 in FIG. 2. Here, a first computer 52 ("computer A") is physically separate from a second computer 54 ("computer B"). Computer 52 is isolated from an external network 56, being coupled to computer 54 via an isolated network 58. Given computer 52 is separate from computer 54, however, network 58 is typically a physical network, rather than a virtual network as with computer architecture 10 of FIG. 1.

To interface computer 52 with external network 56, a series of network adapters 60 ("adapter A"), 62 ("adapter B") and 64 ("adapter C") are used, with each managed by a respective device driver 66, 68 and 70, and each having a respective MAC address 72, 74 and 76. Also, as above with architecture 10, adapters 60 and 64, respectively coupled to isolated and external networks 58, 56, are assigned the same MAC address (designated here as "MAC1"). In addition, device drivers 68, 70 are configured to pass layer 2 or MAC layer traffic to one another to effectively relay appropriate data frames between networks 56, 58 in a manner consistent with the invention.

Figure 3:
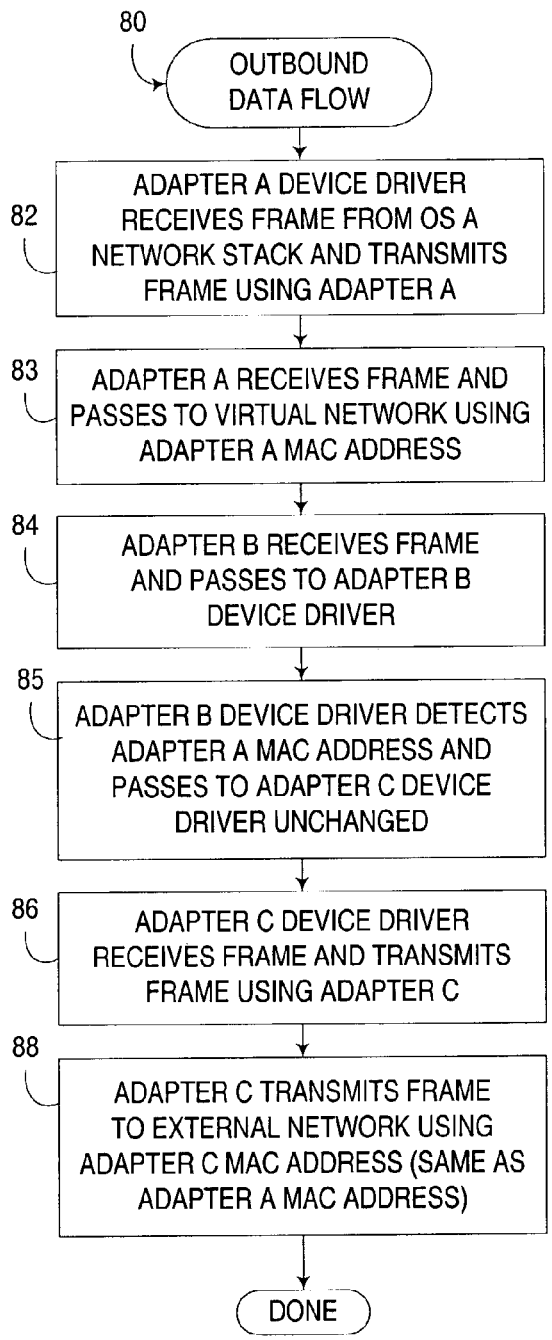
FIG. 3 is a flowchart illustrating the sequence of operations during transmission of outbound data from an isolated network adapter in either of the computer architectures of FIGS. 1 and 2.
Figure 4:
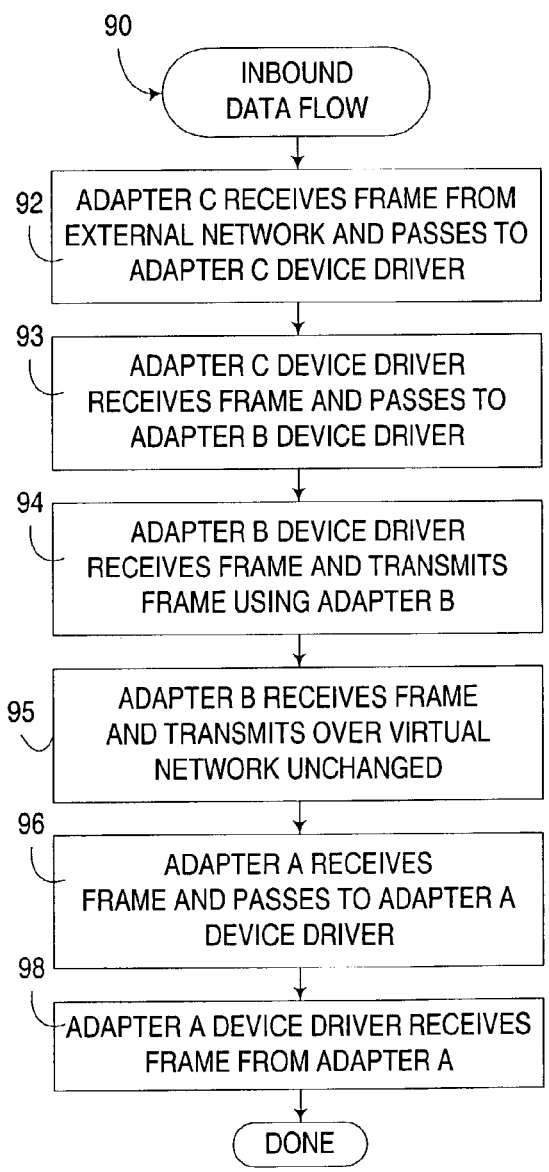
FIG. 4 is a flowchart illustrating the sequence of operations during transmission of inbound data to an isolated network adapter in either of the computer architectures of FIGS. 1 and 2.

The specific manner in which frames are bridged between isolated and external networks in architectures 10 and 50 is further illustrated by the flowcharts illustrated in FIGS. 3 and 4.

FIG. 3, in particular, illustrates at 80 the outbound data flow that occurs whenever computer A (computer 12 or 52 of FIGS. 1, 2) attempts to send a packet to an external network 16, 56. Starting in block 82, the adapter A device driver receives a frame from the network stack of the operating system for computer A (designated "OS A") and transmits the frame using adapter A. Next, as shown in block 83, adapter A receives the frame and passes the frame to the virtual network using the adapter A MAC address as the source address for the frame.

Next, as shown in block 84, adapter B receives the frame and passes the frame to the adapter B device driver. Thereafter, as shown in block 85, the adapter B device driver detects the adapter A MAC address as the source address of the transmitted frame, and, in response to such detection, passes the frame to the adapter C device driver unchanged (i.e., with the source MAC address still specifying adapter A as the source of the packet).

Next, as shown in block 86, the adapter C device driver receives the frame and transmits the frame using adapter C. As shown in block 88, adapter C then transmits the frame to the external network using the adapter C MAC address as the source address for the frame. Given, that the adapter C MAC address is the same as the adapter A MAC address, however, it appears from the perspective of another network adapter coupled to the external network, that adapter A is the source of the transmitted frame.

Likewise, FIG. 4 illustrates at 90 the inbound data flow that occurs when a network adapter coupled to an external network attempts to communicate data to computer A via network adapter A. As shown at block 92, a frame communicated to an external network is received by adapter C (as the adapter is configured with the same MAC address as adapter A) and passed to the adapter C device driver. Next, as shown in block 93, the adapter C device driver receives the frame, and automatically passes the frame to the adapter B device driver. Next, as shown in block 94, the adapter B device driver receives the frame and transmits the frame using adapter B, whereby as shown in block 95, the adapter B receives the frame and transmits such over the virtual network unchanged (i.e., using the same source MAC address as was provided in the original frame).

Next, as shown in block 96, adapter A receives the frame over the isolated network, and passes the frame to the adapter A device driver. Thereafter, as shown in block 98, the adapter A device driver receives the frame from adapter A, whereby reception of the frame by computer A is complete.

It will be appreciated therefore that the passing of frames between an isolated network and an external network is implemented at least in part through the interaction of the device drivers for adapters B and C. Where computer B represents a logical partition in a logically-partitioned computer, for example, the device drivers are resident in the partition operating system. Where computer B is a separate computer from computer A, the device drivers are likewise implemented within a common operating system. It will be appreciated that configuration of each device driver to implement the herein-described functionality would be well within the ability of one of ordinary skill in the art having the benefit of the instant disclosure.

It should also be noted that, in some embodiments, the invention may be implemented simply via the aforementioned device drivers, along with setting the MAC addresses for adapters A and C to the same value. Otherwise all other software and hardware components may be conventional in nature.

It will also be appreciated that an isolated network may be implemented using any network that is logically isolated from (and thus not directly coupled to) an external network, and that an isolated network may be physical or virtual in nature. Moreover, it will be appreciated that an external network may be practically any type of network, whether physical or virtual in nature. Therefore, the invention is not limited to the particular implementations discussed herein.

As noted above, the aforementioned technique for bridging an isolated network to an external network may be used in a wide variety of applications. One specific application, which is described in greater detail below in connection with FIGS. 5-7, is that of bridging network traffic from an integrated card-based computer in a logically-partitioned computer such as computer 110 of FIG. 5.

Computer 110, in particular, generically represents, for example, any of a number of multi-user computers such as a network server, a midrange computer, a mainframe computer, etc., e.g., an IBM eServer iSeries computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). In addition, the invention may also be utilized in connection with non-logically partitioned multithreaded computers.

Figure 5:
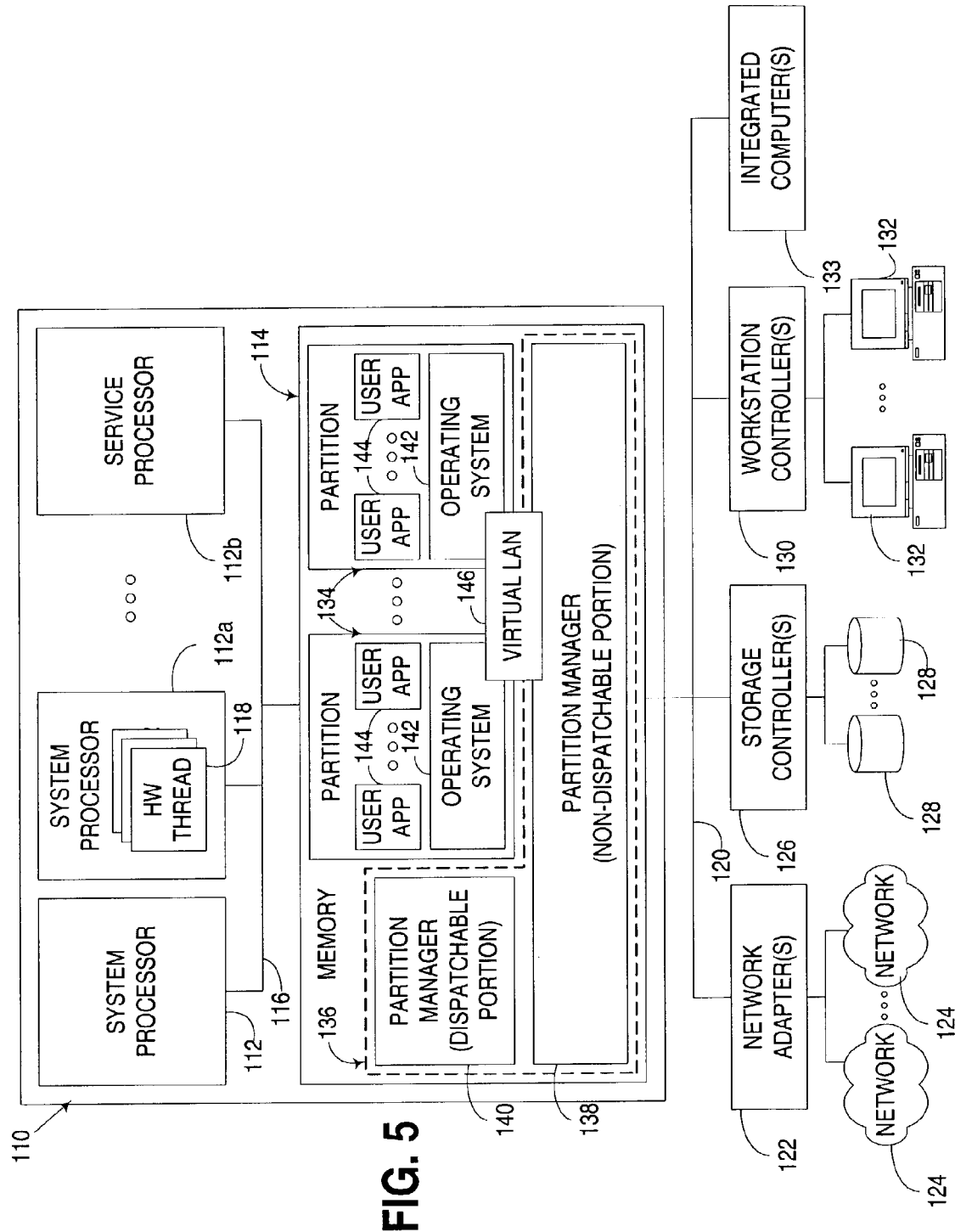
FIG. 5 is a block diagram of the principal hardware components in a logically-partitioned computer implementing MAC layer network bridging consistent with the invention.

As best shown in FIG. 5, computer 110 generally includes one or more processors 112 coupled to a memory 114 via a bus 116. Each processor 112 may be implemented as a single threaded processor, or as a multithreaded processor, such as with processor 112a, which is shown incorporating a plurality of hardware threads 118. For the most part, each hardware thread 118 in a multithreaded processor 112a is treated like an independent processor by the software resident in the computer. In this regard, for the purposes of this disclosure, a single threaded processor will be considered to incorporate a single hardware thread, i.e., a single independent unit of execution. It will be appreciated, however, that software-based multithreading or multitasking may be used in connection with both single threaded and multithreaded processors to further support the parallel performance of multiple tasks in the computer.

In addition, as is also illustrated in FIG. 5, one or more of processors 112 (e.g., processor 112b) may be implemented as a service processor, which is used to run specialized firmware code to manage system initial program loads (IPLs), and to monitor, diagnose and configure system hardware. Generally, computer 110 will include one service processor and multiple system processors, which are used to execute the operating systems and applications resident in the computer, although the invention is not limited to this particular implementation. In some implementations, a service processor may be coupled to the various other hardware components in the computer in manner other than through bus 116.

Memory 114 may include one or more levels of memory devices, e.g., a DRAM-based main storage, as well as one or more levels of data, instruction and/or combination caches, with certain caches either serving individual processors or multiple processors as is well known in the art. Furthermore, memory 114 is coupled to a number of types of external devices via a bus 120, e.g., one or more physical network adapters 122 (for interfacing the computer with external network(s) 124), one or more storage controllers 126 (for interfacing the computer with one or more storage devices 128) and one or more workstation controllers 130 (for interfacing with one or more terminals or workstations 132 via a plurality of workstation adapters).

An additional type of external device that may be coupled to bus 120 is one or more integrated computers 133, e.g., integrated card-based computers such as Integrated xSeries servers available from IBM. As is known in the art, an Integrated xSeries server provides an Intel-based server on a PCI card and running a version of a Microsoft Windows operating system, which is capable of being plugged into a PCI slot in an IBM iSeries server to leverage the iSeries server's system management, communication and storage resources, while otherwise operating as a standalone Windows-based server. Other forms of integrated computers, whether or not card-based, may be used consistent with the invention.

FIG. 5 also illustrates in greater detail the primary software components and resources utilized in implementing a logically partitioned computing environment on computer 110, including a plurality of logical partitions 134 managed by a partition manager or hypervisor 136. Any number of logical partitions may be supported as is well known in the art, and the number of logical partitions resident at any time in a computer may change dynamically as partitions are added or removed from the computer.

In the illustrated IBM eServer-based implementation, partition manager 136 is comprised of two layers of program code. The first, referred to herein as a non-dispatchable portion 138, is implemented within the firmware, or licensed internal code (LIC), of computer 110, which is utilized to provide a low level interface to various hardware components while isolating higher layers, e.g., the operating systems, from the details of the hardware access. The firmware may also communicate with a service processor such as service processor 112b. The non-dispatchable portion 138 provides many of the low level partition management functions for computer 110, e.g., page table management, etc. The non-dispatchable portion 138 also has no concept of tasks, and is accessible principally via function calls from higher layers of software.

The second layer of program code in partition manager 136 is referred to herein as a dispatchable portion 140. In contrast to non-dispatchable portion 138, which has no concept of tasks, is run with relocation off, and is accessible via function calls from higher layers of software, the dispatchable portion 140 has the concept of tasks (like any operating system), and is run with relocation on. The dispatchable portion typically executes in much the same manner as a partition, except that it is hidden from the user. The dispatchable portion generally manages higher level partition management operations such as creating and deleting partitions, concurrent I/O maintenance, allocating processors, memory and other hardware resources to various partitions 134, etc.

Each logical partition 134 is typically statically and/or dynamically allocated a portion of the available resources in computer 110. For example, each logical partition may be allocated one or more processors 112 and/or one or more hardware threads 118, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, integrated computers, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each logical partition 134 utilizes an operating system 142 that controls the primary operations of the logical partition in the same manner as the operating system of a non-partitioned computer. For example, each operating system 142 may be implemented using the OS/400 operating system available from International Business Machines Corporation.

Each logical partition 134 executes in a separate, or independent, memory space, and thus each logical partition acts much the same as an independent, non-partitioned computer from the perspective of each user application (user app) 144 that executes in each such logical partition. As such, user applications typically do not require any special configuration for use in a partitioned environment.

Given the nature of logical partitions 134 as separate virtual computers, it may be desirable to support interpartition communication to permit the logical partitions to communicate with one another as if the logical partitions were on separate physical machines. As such, in some implementations it may be desirable to support a virtual local area network (LAN) 146 in non-dispatchable portion 138 to permit logical partitions 134 to communicate with one another via a networking protocol such as the Ethernet protocol. Other manners of supporting communication between partitions may also be supported consistent with the invention. Moreover, as will become more apparent below, within each logical partition 134 may be supported a virtual network (not shown in FIG. 5) to allow integrated computers resident in a given logical partition to communicate with one another.

It will be appreciated that other logically-partitioned environments may be utilized consistent with the invention. For example, rather than utilizing a dispatchable portion 140 that is separate from any partition 134, the functionality of the dispatchable portion may be incorporated into one or more logical partitions in the alternative.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 5 is not intended to limit the present invention. Indeed, those skilled in the art will recognize that other alternative hardware and/or software environments may be used without departing from the scope of the invention.

FIG. 6 next illustrates the principal components involved in communicating data between two integrated computers in separate logical partitions of the logically-partitioned computer of FIG. 5. In particular, FIG. 6 illustrates at 150 a pair of logical partitions 152, 154 coupled by a virtual Ethernet network 156. Within each logical partition 152, 154 is a plurality of server cards (integrated computers) 158 logically coupled to one another via a virtual Ethernet network 160. Each virtual network 160 represents an intra-partition network, while virtual network 156 represents an inter-partition network.

To maintain logical independence of partitions, it is desirable to prohibit a server card 158 in one partition from communicating directly with a server card resident in another logical partition. In this configuration, therefore, network 156 is an external network with respect to the logical partition, while each virtual network 160 is an isolated network.

To couple each server card 158 to virtual network 160, each server card utilizes a device driver/virtual network adapter pair. For example, for logical partition 152, a pair of server cards A and B are shown, with server card A having a device driver DD1 and virtual network adapter VA1, and server card having a device driver DD2 and virtual network adapter VA2. Consistent with the invention, communication between either of server cards A and B, and another server card located in another logical partition, is implemented by incorporating into logical partition 152 a pair of virtual network adapters VA1', VA2' coupled to virtual network 156, and sharing the same MAC address as virtual network adapters VA1 and VA2. In addition, to bridge network traffic between networks 156 and 160, additional virtual network adapters VA3 and VA4 are coupled to network 160, and respectively associated with network adapters VA1 and VA2. Network adapters VA1' and VA3, and network adapters VA2' and VA4, are logically coupled to one another via interaction of corresponding device drivers DD1' and DD3, and DD2' and DD4. The logical connections are represented at 162. In addition, as illustrated in FIG. 6, the logical partition 152 may itself have a virtual port to network 156, via a network adapter VAS managed by device DD5.

Likewise, for logical partition 154, a pair of server cards C and D are illustrated, each including a virtual network adapter VA6, VA7 managed by a respective device driver DD6, DD7. Associated with such network adapters are a pair of virtual network adapters VA8 and VA9, managed via device drivers DD8 and DD9 and coupled to network 160. Logical pathways 162 couple these latter device drivers to a pair of device drivers DD6' and DD7', which manage a pair of virtual network adapters VA6' and VA7', coupled to network 156. In addition, logical partition 154 may include a dedicated network adapter VA10 coupled to virtual network 156 and managed by device driver DD10. As with logical partition 152, virtual network adapters VA6' and VA7' of logical partition 154 have the same MAC address as virtual network adapters VA6 and VA7.

To communicate, for example, between server card A in logical partition 152 and server card D in logical partition 154, server card A, via device driver DD1, sends a network frame to virtual network 160 using virtual network adapter VA1. The network frame uses the MAC address of adapter VA1 as the source address, and the MAC address of adapter VA7 as the destination address. The transmission of this network frame is detected by virtual network adapter VA3, whereupon device driver DD3 relays the frame to device driver DD1', resulting in the transmission of the network frame to virtual network 156 via adapter VA1'. Moreover, by virtue of the same MAC address for network adapters VA1 and VA1', the transmitted frame will have a source MAC address that matches that of network adapter VA1.

In addition, it is assumed that, with server card A intending to communicate to server card D, the destination MAC address for the network frame will be the MAC address associated with virtual network adapter VA7. As such, virtual network adapter VA7', having the same MAC address, will detect the transmission of the frame on network 156, and pass the frame to device driver DD7', which will then forward the network frame to device driver DD9. Thereafter, the network frame is forwarded to network 160 via virtual network adapter VA9, with the destination MAC address for the frame being that of virtual network adapter VA7. As such, the frame will be received by virtual network adapter VA7 and passed to device driver DD7 for processing by server card D.

FIG. 6 therefore illustrates the transmission of a network frame between integrated computers resident in different logical partitions via the use of intra-partition and inter-partition networks, each of which being virtual in nature. In some implementations, however, it may be desirable to alternatively or additionally interface an integrated computer with a physical network.

For example, as illustrated at 180 of FIG. 7, a logical partition 182 may be coupled to a physical Ethernet network 186, and may have resident therein a plurality of server cards 188 coupled to an isolated virtual Ethernet network 190. To support bridging to network 186, each server card may be associated with three device driver/network adapter pairs, as in FIG. 6. For example, for server cards E and F illustrated in FIG. 7, each may have associated therewith a virtual network adapter VA11, VA12, with a matched device driver DD11, DD12, and coupled to virtual network 190. In turn, an additional network adapter VA13, VA14 may be coupled to network 190, with a matched device driver DD13, DD14 coupled via pathway 192 to a device driver DD11', DD12', used to manage a physical network adapter PA11', PA12', coupled to physical network 186. In addition, the partition 182 may include a dedicated physical adapter PA15 managed by device driver DD15 to handle partition-related communications over the network 186.

The configuration of FIG. 7 may be utilized, for example, when server cards 188 are not provided with dedicated Ethernet ports, but must otherwise rely on a logically-partitioned computer within which such server cards are installed, to provide external network connectivity. Communication between a server card and a network adapter coupled to network 186 proceeds in much the same manner as described above. For example, to communicate a network frame from server card E, device driver DD11 utilizes virtual network adapter VA11 to communicate the network frame to virtual network 190, with the source MAC address being that of virtual network adapter VA11, and the destination MAC address being that of a network adapter coupled to network 186. Transmission of the frame on network 190 is detected by virtual network adapter VA13, resulting in the transmission of the frame to physical network adapter PA11' via the cooperation of device drivers DD13 and DD11' communicating over pathway 192. Physical network adapter PA11' is configured to have the same MAC address as virtual network adapter VA11, resulting in the network frame output on network 186 having a source MAC address matching that of virtual network adapter VA11.

Likewise, for communications to server card E, a network frame having a destination MAC address matching that of both physical network adapter PA11' and virtual network adapter VA11 is transmitted over network 186. Via the cooperation of device drivers DD11' and DD13, the frame, once received by physical network adapter PA11' is communicated by virtual network adapter VA13 over network 190. The frame, once communicated over network 190, and as a result of having a destination MAC address matching that of virtual network adapter VA11, will be received by such network adapter and passed to device driver DD11 for handling by server card E.

Various modifications to the herein-described embodiments will be apparent to one of ordinary skill in the art having the benefit of the instant disclosure. Therefore, the invention lies in the claims hereinafter appended.

What is claimed is:

1. A method of interconnecting first and second integrated computers respectively resident in first and second logical partitions in a logically-partitioned computer system, the method comprising:

in a first device driver resident in the first integrated computer, initiating transfer of a network frame over a first virtual network in the first logical partition using a first virtual network adapter coupled to the first virtual network, wherein the network frame has a source media access control (MAC) address identifying a first MAC address associated with the first virtual network adapter, and a destination MAC address identifying a second MAC address;

in a second device driver for a second virtual network adapter coupled to the first virtual network, detecting that the network frame communicated to the first virtual network is from the first virtual network adapter by detecting the first MAC address in the network frame, and in response thereto, forwarding the network frame to a third device driver for a third network adapter coupled to an inter-partition network;

in the third device driver, initiating transfer of the network frame over the inter-partition network using the third network adapter and using the first MAC address as the source MAC address for the network frame;

in a fourth device driver for a fourth network adapter coupled to the inter-partition network, detecting that the network frame communicated to the inter-partition network is addressed to a sixth virtual network adapter coupled to a second virtual network in the second logical partition and associated with the second MAC address, and in response thereto, forwarding the network frame to a fifth device driver for a fifth virtual network adapter coupled to the second virtual network;

in the fifth device driver, initiating transfer of the network frame over the second virtual network using the fifth network adapter; and receiving the network frame with the sixth network adapter and passing the network frame to a sixth device driver resident in the second integrated computer.

2. A method of bridging first and second networks, the first network coupled to a first computer via a first network adapter in the first computer, and the second network coupled to a second computer via a second network adapter in the second computer, and wherein the first network is an isolated network and the first network adapter is an isolated network adapter, the method comprising, in the second computer:

detecting a first network frame communicated by the first computer over the first network by detecting a media access control (MAC) address for the first network frame that is associated with the first network adapter;

forwarding the first network frame to the second network using the second network adapter such that a source MAC address for the first network frame identifies the first network adapter as a source of the first network frame;

receiving a second network frame from the second network via the second network adapter, wherein the second network frame is addressed to the MAC address associated with the first network adapter; and forwarding the second network frame to the first network;

wherein detecting the first network frame is performed by a device driver for a third network adapter coupled to the first network, and wherein forwarding the first network frame to the second network comprises passing the first network frame from the device driver for the third network adapter to a device driver for the second network adapter, and transmitting the first network frame to the second network using the third network adapter.

3. The method of claim 2, wherein the first network is a virtual network and the first network adapter is a virtual network adapter.

4. The method of claim 3, wherein the second network is a virtual network and the second network adapter is a virtual network adapter.

5. The method of claim 4, wherein the second computer comprises a logical partition in a logically-partitioned computer system, wherein the first network comprises an intra-partition network resident in the logical partition, and wherein the second network comprises an inter-partition network coupled to a plurality of logical partitions.

6. The method of claim 3, wherein the second network is a physical network and the second network adapter is a physical network adapter.

7. The method of claim 3, wherein the first computer is integrated into the second computer.

8. The method of claim 7, wherein the first computer comprises an integrated card-based computer.

9. The method of claim 3, wherein the second computer comprises a logical partition in a logically-partitioned computer system.

10. The method of claim 2, wherein forwarding the second network frame to the first network comprises passing the second network frame from the device driver for the second network adapter to the device driver for the third network adapter, and transmitting the second network frame to the first network using the third network adapter.

11. The method of claim 2, wherein the first and third network adapters are assigned the same MAC address.

* * * * *